United States Patent
Yamaguchi et al.

(10) Patent No.: US 10,852,222 B2
(45) Date of Patent: Dec. 1, 2020

(54) METHOD OF INSPECTING ULTRAVIOLET CURABLE RESIN FOR OPTICAL FIBER AND METHOD OF MANUFACTURING OPTICAL FIBER

(71) Applicant: SUMITOMO ELECTRIC INDUSTRIES, LTD., Osaka (JP)

(72) Inventors: Akihisa Yamaguchi, Utsunomiya (JP); Masayuki Kato, Utsunomiya (JP); Hitoshi Tsubakiyama, Utsunomiya (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 779 days.

(21) Appl. No.: 15/078,103

(22) Filed: Mar. 23, 2016

(65) Prior Publication Data

US 2016/0282250 A1   Sep. 29, 2016

(30) Foreign Application Priority Data

Mar. 24, 2015   (JP) ................. 2015-060411

(51) Int. Cl.
  *G01N 7/14*  (2006.01)
  *C09D 5/00*  (2006.01)
  (Continued)

(52) U.S. Cl.
  CPC ............. *G01N 7/14* (2013.01); *C09D 5/00* (2013.01); *C09D 201/00* (2013.01); *G01M 11/088* (2013.01); *G02B 6/02395* (2013.01)

(58) Field of Classification Search
  CPC ........ G01N 7/14; G02B 6/02395; C09D 5/00; C09D 201/00
  (Continued)

(56) References Cited

U.S. PATENT DOCUMENTS 6,174,604 B1 * 1/2001 Akita ................. C03C 25/106
                                                      428/375

FOREIGN PATENT DOCUMENTS

CN   A-1071013       4/1993
CN   102529124 A  *  7/2012
(Continued)

OTHER PUBLICATIONS

Aho ("Shear viscosity measurements of polymer melts using injection molding machine with adjustable slit die", Aho et al, Polymer Testing 30 (2011) 595-601) (Year: 2011).*

(Continued)

*Primary Examiner* — Michael P Wieczorek
*Assistant Examiner* — Michael G Miller
(74) *Attorney, Agent, or Firm* — Faegre Drinker Biddle & Reath LLP

(57) ABSTRACT

A method of inspecting a degree of air bubbles which are mixed into an ultraviolet curable resin for an optical fiber having viscosity of 1.2 Pa·s to 6.2 Pa·s at a temperature of 25±5° C., is performed in such a manner that the ultraviolet curable resin for an optical fiber which is an inspecting target is put into a sealed apparatus, then the inside of the sealed apparatus is decompressed to be a predetermined pressure, and then the sealed apparatus is left to stand as it is for a predetermined time. If a ratio of the volume expansion of the ultraviolet curable resin for an optical fiber is equal to or less than a predetermined threshold, the ultraviolet curable resin for an optical fiber is recognized as an accepted product.

7 Claims, 6 Drawing Sheets

(51) Int. Cl.
  *C09D 201/00* (2006.01)
  *G02B 6/02* (2006.01)
  *G01M 11/08* (2006.01)

(58) Field of Classification Search
  USPC .................. 427/162–169; 73/19.01–19.12
  See application file for complete search history.

(56) References Cited

FOREIGN PATENT DOCUMENTS

| | | |
|---|---|---|
| CN | 103212220 A | 7/2013 |
| CN | A-103674757 | 3/2014 |
| JP | S62-210009 A | 9/1987 |
| JP | A-H06-063482 | 3/1994 |
| JP | A-2003-225509 | 8/2003 |

OTHER PUBLICATIONS

Machine Translation, CN102529124 (Year: 2012).*
Elgin (https://focenter.com/polymer-expert-blog-defeating-bubbles-part-ii/ accessed online Oct. 15, 2018) (Year: 2016).*

* cited by examiner

METHOD OF INSPECTING ULTRAVIOLET CURABLE RESIN FOR OPTICAL FIBER AND METHOD OF MANUFACTURING OPTICAL FIBER

CROSS-REFERENCE TO RELATED APPLICATION

The present application claims the benefit of priority of Japanese Patent Application No. 2015-060411, filed on Mar. 24, 2015, which is incorporated herein by reference.

BACKGROUND

Technical Field

The present invention relates to a method of inspecting an ultraviolet curable resin for an optical fiber and a method of manufacturing an optical fiber.

Related Art

A technique of defoaming a highly viscous liquid in such a manner that the highly viscous liquid is decompressed and is put into a sealed container, and then is centrifugally separated by rotating the sealed container (for example, refer to Japan Patent Publication No. S62-210009 (JP-A-S62-210009) has been known. In addition, the specification of Chinese Patent Publication No. 103212220 (CN-A-103212220) discloses a revolving speed, a time of a resin, and the like at the time of defoaming air bubbles in the resin by revolving a container including the resin therein.

In a case where air (small air bubbles) is included in an ultraviolet curable resin for an optical fiber (which includes a case of ink containing a pigment for coloring) which is a raw material of a coating material of the optical fiber, due to a pressure change before and after passing through a die for resin coating in the manufacturing of the optical fiber, or heating by using a UV furnace, the air in the resin is foamed and thus air bubbles are generated. If the air bubbles are present in the resin of the optical fiber, the resin unevenly shrinks in a circumferential direction and thus a bare optical fiber is pressurized, which causes a loss increase (low-temperature loss) particularly when a temperature is set to be low. In addition, unevenness such as a hump is formed on the surface of the resin, and thereby an appearance defect, or the like occurs in the optical fiber.

For this reason, for example, as disclosed in the above-described JP-A-S62-210009 and the specification of CN-A-103212220, a method of removing the air bubbles in advance by performing a defoaming process on the ultraviolet curable resin for an optical fiber has been known. However, an inspection of the resin or the like after being subjected to the defoaming process is not disclosed in JP-A-S62-210009 and the specification of CN-A-103212220, and pertaining to the ultraviolet curable resin for an optical fiber after the defoaming process, the criteria for determining whether or not the air is deflated to the extent that no problems are caused in the manufacturing of the optical fiber are not generally defined. In addition, it is difficult to visually determine whether or not the air is deflated to the extent that no problems are caused in the manufacturing, and even if it is visually determined that the air bubbles are not present in the resin, there is a possibility that the air bubbles are generated after the bare optical fiber is coated with the ultraviolet curable resin for an optical fiber.

SUMMARY

An object of the present invention is to provide a method of inspecting an ultraviolet curable resin for an optical fiber and a method of manufacturing an optical fiber, which are capable of preventing the occurrence of a loss increase, an appearance defect, or the like in a manufactured optical fiber by determining whether or not air bubbles are mixed into an ultraviolet curable resin for an optical fiber with which an optical fiber is coated.

According to an aspect of the invention, there is provided a method of inspecting an ultraviolet curable resin for an optical fiber, the method being performed in such a way to inspect a degree of air bubbles which are mixed into an ultraviolet curable resin for an optical fiber having viscosity of 1.2 Pa·s to 6.2 Pa·s at a temperature of 25±5° C., in which the ultraviolet curable resin for an optical fiber which is an inspection target is put into a sealed apparatus, the inside of the sealed apparatus is decompressed to a predetermined pressure, and then the inspection target is left to stand as it is for a predetermined time. Thereafter, if a ratio of volume expansion of the ultraviolet curable resin for an optical fiber is equal to or less than a predetermined threshold, the ultraviolet curable resin for an optical fiber is recognized as an accepted product.

According to another aspect of the present invention, there is provided a method of manufacturing an optical fiber, in which an optical fiber is manufactured in such a manner that a bare optical fiber is coated with the ultraviolet curable resin for an optical fiber which is recognized as an accepted product in the above-described inspection method, and then is the ultraviolet curable resin for an optical fiber is cured.

In the method of inspecting the ultraviolet curable resin for an optical fiber and the method of manufacturing an optical fiber according to the present invention, it is possible to prevent the occurrence of a loss increase, an appearance defect, or the like in the manufactured optical fiber by determining whether or not the air bubbles are mixed into the ultraviolet curable resin for an optical fiber with which the optical fiber is coated.

DETAILED DESCRIPTION

Description of Embodiments of the Invention

Figure 1:
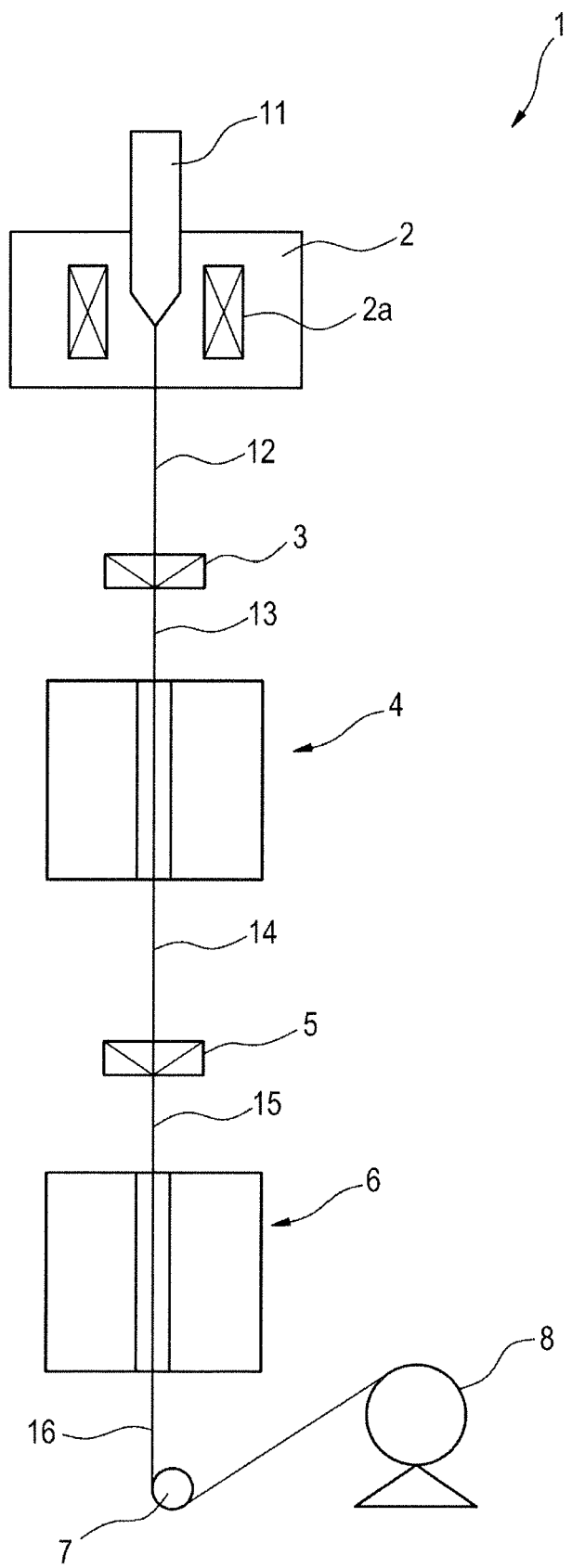
FIG. 1 is a schematic configuration diagram illustrating an example of a manufacturing apparatus which is used in a method of manufacturing an optical fiber according to the present embodiment.

First, an embodiment of the present invention will be described below.

(1) According to the present embodiment, there is provided a method of inspecting an ultraviolet curable resin for an optical fiber having viscosity of 1.2 Pa·s to 6.2 Pa·s at a temperature of 25±5° C., in which the ultraviolet curable resin for an optical fiber which is an inspecting target is put into a sealed apparatus, then the inside of the sealed apparatus is compressed to be a predetermined pressure, and then the sealed apparatus is left to stand for a predetermined time, and if a ratio of the volume expansion of the ultraviolet curable resin for an optical fiber is equal to or less than a predetermined threshold, the ultraviolet curable resin for an optical fiber is recognized as an accepted product.

If the accepted product is used, it is possible to prevent the occurrence of air bubbles in the ultraviolet curable resin for an optical fiber having a viscosity of 1.2 Pa·s to 6.2 Pa·s at a temperature of 25±5° C. in the optical fiber.

With such a configuration, it is possible to prevent the occurrence of a loss increase, an appearance defect, or the like in the manufactured optical fiber.

(2) In the method of inspecting an ultraviolet curable resin for an optical fiber according to the above description (1), the predetermined pressure is set to be equal to or lower than a pressure which is obtained by subtracting 0.05 MPa from an atmospheric pressure, the predetermined time is set to be in a range of 5 minutes to 20 minutes, and the threshold of the ratio of the volume expansion is set to be equal to or lower than 30%.

In the inspecting method according to the description (1), the pressure is decompressed to be equal to or lower than the pressure which is obtained by subtracting 0.05 MPa from the atmospheric pressure, and is left to stand as it is for 5 minutes to 20 minutes. Then, if the ratio of the volume expansion is equal to or lower than 30%, the ultraviolet curable resin for an optical fiber is recognized as an accepted product, and thus it is possible to provide an ultraviolet curable resin for an optical fiber which can more reliably prevent the occurrence of air bubbles in the manufacturing of the optical fiber.

(3) In the method of inspecting an ultraviolet curable resin for an optical fiber according to the above description (1) or (2), the above inspecting process is performed after the ultraviolet curable resin for an optical fiber is subjected to a defoaming process.

The ultraviolet curable resin is inspected after being subjected to the defoaming process, and thus is highly likely to be recognized as an accepted product.

(4) In the method of inspecting an ultraviolet curable resin for an optical fiber according to the above description (1) or (2), the above inspecting process is performed after the ultraviolet curable resin for an optical fiber is stirred and defoamed.

Air bubbles are easily generated at the time of stirring the ultraviolet curable resin for an optical fiber; however, inspecting the degree of the air bubbles which are mixed into the ultraviolet curable resin for an optical fiber through the above-described inspecting method is effective to sort the accepted product through the above inspection.

(5) According to the present embodiment, there is provided a method of manufacturing an optical fiber which is performed in such a manner that a bare optical fiber is coated with the ultraviolet curable resin for an optical fiber which is recognized as an accepted product through the method of inspecting an ultraviolet curable resin for an optical fiber according to one of the above descriptions (1) to (4).

If the optical fiber is manufactured by using the ultraviolet curable resin for an optical fiber which is recognized as an accepted product through the above-described inspection, it is possible to prevent the occurrence of a loss increase and a coating defect of appearance.

Details of Embodiments of the Invention

A method of inspecting an ultraviolet curable resin for an optical fiber and a method of manufacturing an optical fiber according to the embodiment of the present invention will be specifically described with reference to the drawings.

Note that, the present invention is not limited to the examples as described below, and is intended to be described based on the scope of claims, and to include meanings which are equivalent to the scope of claims and all of the modifications within the scope.

As one example of the method of manufacturing of an optical fiber according to the embodiment, an example of manufacturing an optical fiber including a coating resin layer which is obtained in such a manner that a bare optical fiber is coated with an ultraviolet curable resin for an optical fiber (for example, a primary resin, a secondary resin, and ink) which is recognized as an accepted product in the method of inspecting an ultraviolet curable resin for an optical fiber according to the embodiment, and then is cured will be described.

Figure 2:
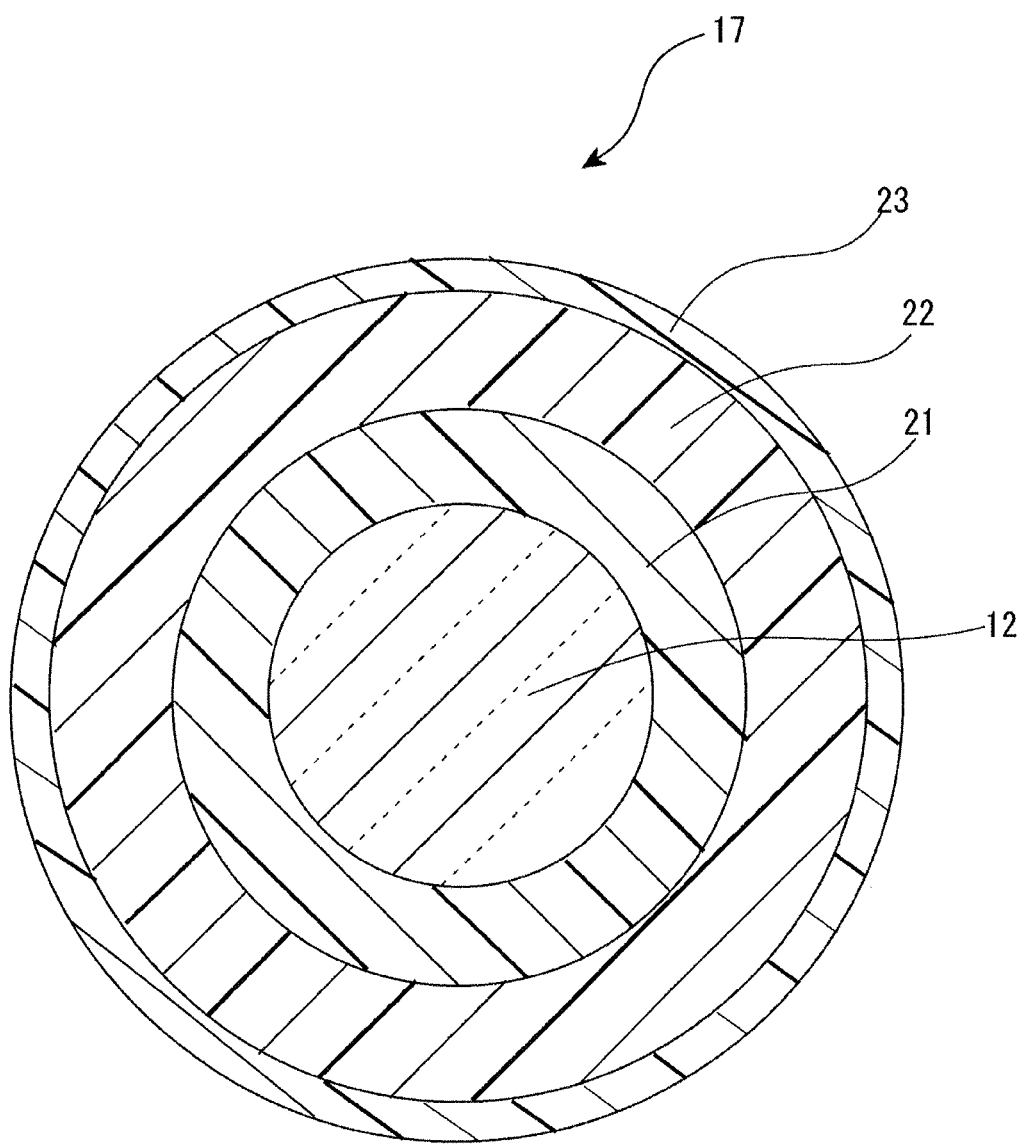
FIG. 2 is a sectional view of the optical fiber in a radial direction, which is manufactured by a method of manufacturing an optical fiber according to the embodiment.

FIG. 1 is a schematic configuration diagram illustrating an example of a manufacturing apparatus which is used in a method of manufacturing an optical fiber according to the embodiment. FIG. 2 is a sectional view of the manufactured optical fiber in a radial direction.

As illustrated in FIG. 1, a manufacturing apparatus 1 is provided with a drawing furnace 2, a primary resin coating apparatus 3, an ultraviolet irradiation apparatus for primary resin 4, a secondary resin coating apparatus 5, an ultraviolet irradiation apparatus for secondary resin 6, a guide roller 7, and a winding bobbin 8. In addition, FIG. 1 illustrates an example of a case where the primary resin coating apparatus 3 and the secondary resin coating apparatus 5 are separately provided, and each of them is separately coated. However, the primary resin coating apparatus 3 and the secondary resin coating apparatus 5 may be concurrently coated by using an apparatus for coating a primary resin and a secondary resin.

As illustrated in FIG. 1, the manufacturing apparatus 1 extends the optical fiber preform 11 formed of quarts glass by heating and melting a tip end thereof with a heater 2a of the drawing furnace 2, and performs melt spinning on the bare optical fiber 12. The bare optical fiber 12 passes through the primary resin coating apparatus 3, and the outer periphery thereof is coated with the primary resin which is the ultraviolet curable resin for an optical fiber. Subsequently, an optical fiber 13 which is coated with the primary resin is put into the ultraviolet irradiation apparatus for primary resin 4, and is irradiated with an ultraviolet ray. With this, the coated primary resin is cured so as to form a primary resin layer 21 (refer to FIG. 2).

An optical fiber 14 in which the primary resin layer 21 is formed passes through the secondary resin coating apparatus 5, and the outer periphery thereof is coated with the ultraviolet curable resin for an optical fiber. Subsequently, an optical fiber 15 which is coated with the secondary resin layer is put into the ultraviolet irradiation apparatus for secondary resin 6, and is irradiated with an ultraviolet ray. With this, the secondary resin layer is cured so as to form a secondary resin layer 22 (refer to FIG. 2). In addition, an optical fiber 16 in which the secondary resin layer 22 is formed is wound by a winding bobbin 8 via a guide roller 7 or the like. In the optical fiber 16 which is wound by the winding bobbin 8, the outer periphery of the secondary resin layer 22 is coated with ink (ultraviolet curable resin for an optical fiber containing a pigment for coloring) in the next coloring step (not shown), and thereby an optical fiber 17 in which an ink layer 23 (refer to FIG. 2) is formed is manufactured.

As illustrated in FIG. 2, the optical fiber 17 which is manufactured through the above-described method of manufacturing is configured such that the primary resin layer 21 is provided on the outer periphery of the bare optical fiber 12, and the secondary resin layer 22 is provided on the outer periphery of the primary resin layer 21, and the ink layer 23 is provided on the outer periphery of the secondary resin layer 22.

Meanwhile, in the manufacturing of the optical fiber 17 as described above, if air (small air bubbles) is included in the ultraviolet curable resin for an optical fiber, the air in the resin is foamed in some cases due to a pressure change before and after passing through a die in the resin coating apparatus (the primary resin coating apparatus 3 or the secondary resin coating apparatus 5), or heating by using an ultraviolet irradiation apparatus (the ultraviolet irradiation apparatus for a primary resin 4 or a ultraviolet irradiation apparatus for a secondary resin 6) in the manufacturing of the optical fiber.

Figure 3:
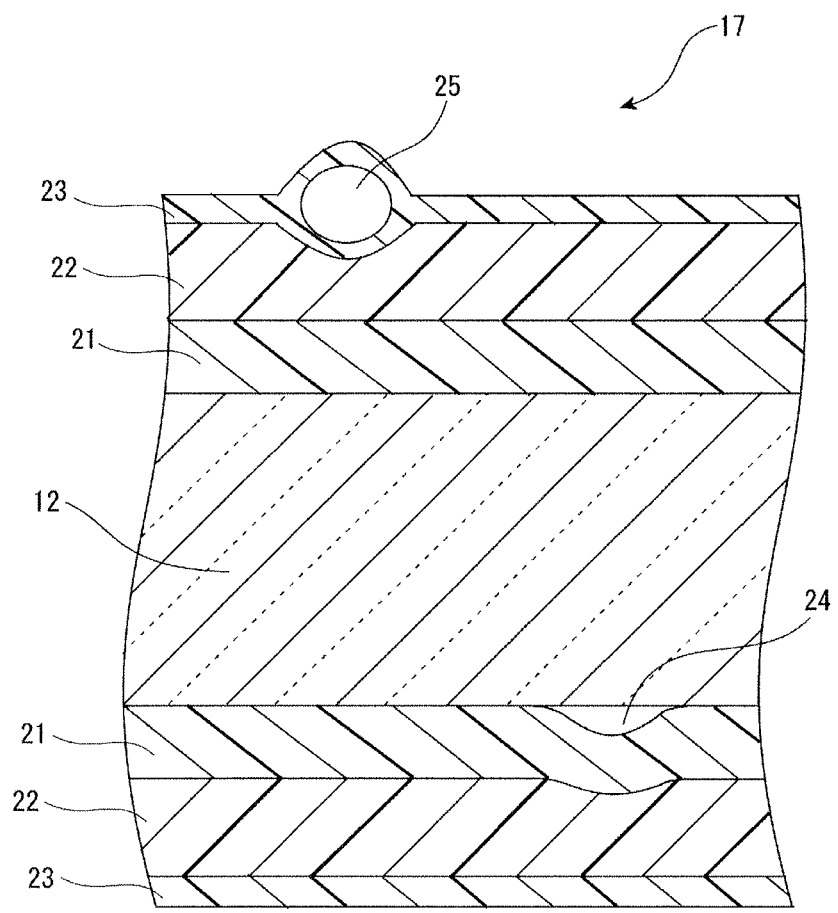
FIG. 3 is a sectional view of the optical fiber in an axial direction in a case where air is foamed in an ultraviolet curable resin for optical fiber.

FIG. 3 is a sectional view of the optical fiber 17 in an axial direction in a case where the air is foamed in an ultraviolet curable resin for an optical fiber. As illustrated in FIG. 3, if an air bubble 24 is present on the inner side of the coating resin layer (for example, the primary resin layer 21) due to the air foaming, the resin unevenly shrinks in a circumferential direction and thus a bare optical fiber 12 is pressured, thereby causing a loss increase particularly when a temperature is set to be low. In addition, if an air bubble 25 is present on the outer side of the coating resin layer (for example, the ink layer 23) due to the air foaming, unevenness such as a hump is formed on the surface of the optical fiber 17, which causes an appearance defect, or the like in the optical fiber.

Meanwhile, regarding the low-temperature loss increase, for example, when a temperature is set to be in a range of +25° C. to −60° C., the low-temperature loss increase is set to be equal to or less than Δ0.05 dB/km (light source wavelength: 1.55 μm), which is defined as a standard.

In order to prevent the occurrence of air bubbles in the coating resin layer (the primary resin layer 21, the secondary resin layer 22, and the ink layer 23) of the optical fiber 17 as illustrated in FIG. 3, it is necessary to perform a defoaming process for deflating the air from the ultraviolet curable resin for an optical fiber. Particularly, in a case of ink, if the ink is left to stand as it is, a pigment is precipitated, and thus it is necessary to stir the ultraviolet curable resin for an optical fiber immediately before manufacturing the optical fiber 17. In addition, during the stirring of the ink, a large amount of air enters the ink, and the defoaming process is essentially required.

Figure 4:
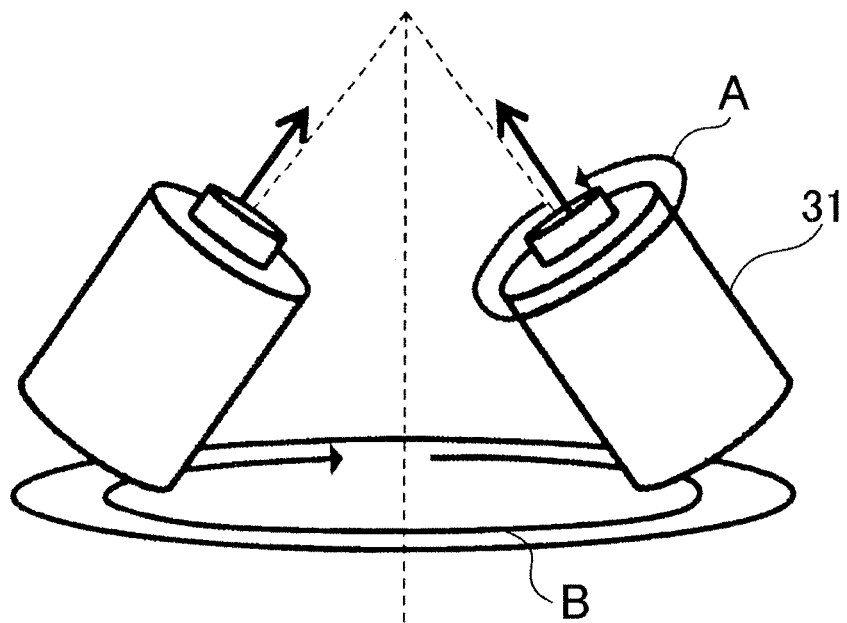
FIG. 4 is a diagram illustrating an example of stirring and a defoaming process with respect to the ultraviolet curable resin for an optical fiber.

Hereinafter, examples of the stirring and the defoaming process with respect to the ultraviolet curable resin for an optical fiber will be described. FIG. 4 is a diagram illustrating an example of a method of the stirring and the defoaming process. FIG. 5 is a diagram illustrating another example of a method of the stirring and the defoaming process.

In the method illustrated in FIG. 4, the stirring and the defoaming process are performed in such a manner that a container 31 which contains the ultraviolet curable resin for an optical fiber is revolved as indicated by an arrow B while being rotated as indicated by an arrow A.

Figure 5A:
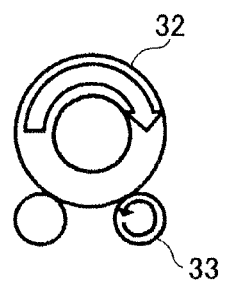
FIG. 5A is a diagram illustrating another example of stirring process with respect to the ultraviolet curable resin for an optical fiber.
Figure 5B:
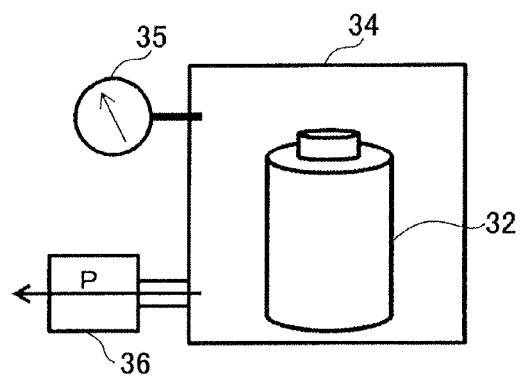
FIG. 5B is a diagram illustrating another example of a defoaming process with respect to the ultraviolet curable resin for an optical fiber.

In the method illustrated in FIGS. 5A and 5B, the stirring and the defoaming process are performed as follows; first, as shown in FIG. 5A, the stirring is performed in such a manner that a container 32 which contains the ultraviolet curable resin for an optical fiber is rotated as a driving shaft 33 is rotated. Thereafter, as shown in FIG. 5B, the defoaming process is performed in such a manner that the container 32 is put into a vacuum apparatus 34, and then decompressing is performed by using a vacuum pump 36. At this time, the pressure in the vacuum apparatus 34 is measured by using a pressure gauge 35, and the vacuum apparatus 34 is decompressed until the pressure approaches a predetermined pressure.

Figure 6:
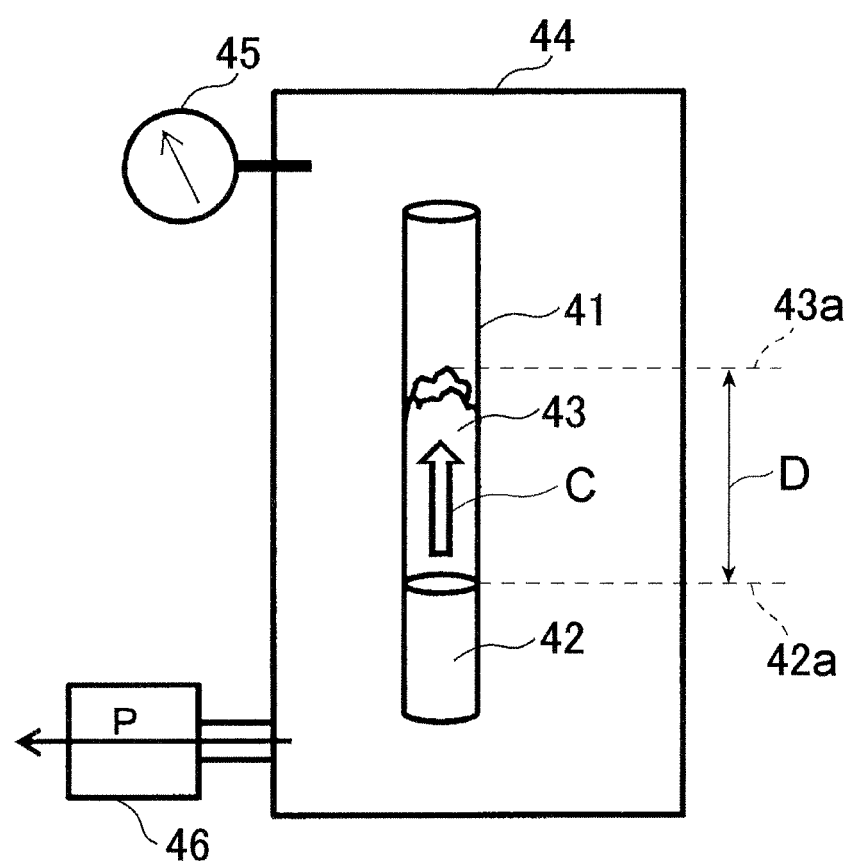
FIG. 6 is an explanatory diagram illustrating an example of a method of inspecting an ultraviolet curable resin for an optical fiber according to the embodiment.

The method of inspecting the ultraviolet curable resin for an optical fiber according to the embodiment will be described with reference to FIG. 6. FIG. 6 is an explanation diagram illustrating an example of the method of inspecting the ultraviolet curable resin for an optical fiber according to the embodiment.

For example, in the method illustrated in FIG. 4 or FIG. 5 as described above, the stirring and the defoaming process are performed on the ultraviolet curable resin for an optical fiber having viscosity of 1.2 Pa·s to 6.2 Pa·s at a temperature of 25±5° C., and thereby an ultraviolet curable resin 42 for an optical fiber is obtained. With respect to this ultraviolet curable resin 42 for an optical fiber, the following inspection is performed.

The temperature of the ultraviolet curable resin 42 for an optical fiber is stably set to be 25±5° C. before performing the inspection.

In addition, as illustrated in FIG. 6, the ultraviolet curable resin 42 for an optical fiber which is subjected to the defoaming process is put into a test tube 41 with a predetermined amount of liquid level, and then the test tube 41 is placed in a vacuum apparatus 44 (a sealed apparatus). After confirming that a liquid level 42a becomes constant in the test tube 41, the pressure in the vacuum apparatus 44 is decompressed to be equal to or lower than the pressure which is obtained by subtracting 0.05 MPa from the atmospheric pressure, by using a vacuum pump 46 while measuring the pressure in the vacuum apparatus 44 by a pressure gauge 45. When the pressure in the vacuum apparatus 44 is lowered, the ultraviolet curable resin 42 for an optical fiber in the test tube 41 is foamed and an air bubble 43 is generated in the direction of an arrow C in FIG. 6.

Since the air bubble 43 which is generated by foaming the ultraviolet curable resin 42 for an optical fiber bursts and then is removed, the liquid level rising is stopped when the liquid level rises to a certain extent. After being left to stand as it is for a predetermined time, a liquid level rise D from the liquid level 42a before being compressed is measured by confirming the highest liquid level 43a at which the liquid level rising is stopped. Since it takes about 5 minutes for the air bubble 43 to start the expansion, and it takes about 20 minutes for the air bubble to burst, the above-described predetermined time is set to be within 5 minutes to 20 minutes, for example.

From the aforementioned liquid level rise D, the ratio of the volume expansion of the ultraviolet curable resin 42 for an optical fiber due to the air bubbles generated at the time of the decompressing is seen.

In the embodiment, if the ratio of the volume expansion of the ultraviolet curable resin 42 for an optical fiber due to the air bubbles is equal to or lower than a predetermined threshold, the ultraviolet curable resin 42 for an optical fiber is recognized as an accepted product.

Figure 7:
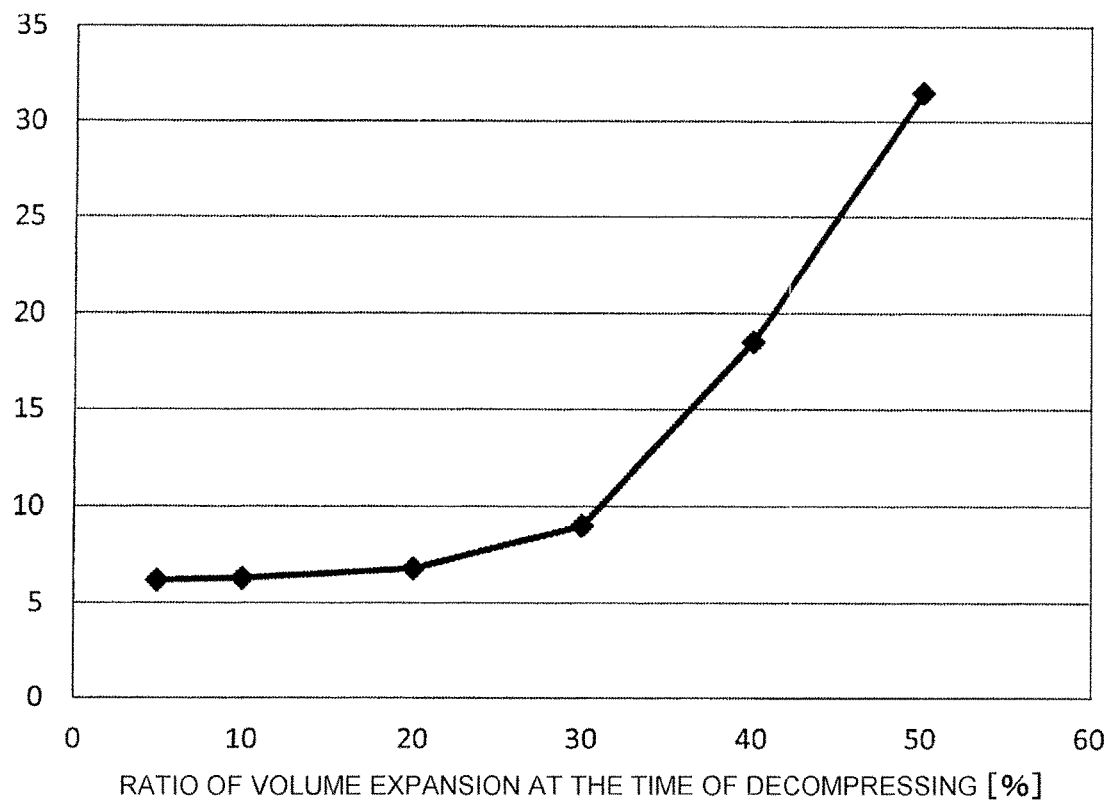
FIG. 7 is a graph illustrating a relationship between a ratio of appearance defects of the optical fiber and a ratio of volume expansion at the time of decompressing.

The graph in FIG. 7 illustrates a relationship between the obtained ratio of the volume expansion when the ultraviolet curable resin 42 for an optical fiber (ink) containing a pigment for coloring is decompressed and foamed by using the method illustrated in the aforementioned FIG. 6, and the ratio of appearance defect of the optical fiber which is manufactured by using the ultraviolet curable resin 42 for an optical fiber.

As illustrated in FIG. 7, it is found that if the ratio of the volume expansion at the time of decompressing is greater than 30%, the appearance defect of the optical fiber is rapidly increased.

For this reason, it is preferable that if the predetermined threshold is set to be 30%, and the ratio of the volume expansion of the ultraviolet curable resin 42 for an optical fiber due to the occurrence of air bubbles is equal to or lower than 30%, the ultraviolet curable resin 42 for an optical fiber is recognized as an accepted product.

In the method of inspecting the ultraviolet curable resin for an optical fiber according to the embodiment as described above, it is possible to prevent the occurrence of air bubbles in the ultraviolet curable resin 42 for an optical fiber having viscosity of 1.2 Pa·s to 6.2 Pa·s at a temperature of 25±5° C. in the manufacturing of the optical fiber. With this configuration, it is possible to prevent the loss increase, the appearance defect, or the like.

Further, the pressure is decompressed to be equal to or lower than the pressure which is obtained by subtracting 0.05 MPa from the atmospheric pressure, and is left to stand as it is for 5 minutes to 20 minutes. Then, if the ratio of the volume expansion is equal to or lower than 30%, the ultraviolet curable resin 42 for an optical fiber is recognized as an accepted product, and thus it is possible to provide the ultraviolet curable resin 42 for an optical fiber which can more reliably prevent the occurrence of air bubbles in the manufacturing of the optical fiber.

Meanwhile, in a case where the ultraviolet curable resin 42 for an optical fiber is inspected after being subjected to the defoaming process, the ultraviolet curable resin 42 for an optical fiber is highly likely to be recognized as an accepted product.

In addition, in a case where the ultraviolet curable resin 42 for an optical fiber is inspected after being stirred and defoamed, the air bubbles are easily generated at the time of stirring the ultraviolet curable resin 42 for an optical fiber; however, the degree of the air bubbles which are mixed into the ultraviolet curable resin 42 for an optical fiber is inspected through the above-described inspecting method so as to sort the accepted product through the above inspection, and thereby it is possible to prevent the occurrence of air bubbles in the manufacturing of the optical fiber.

In the method of manufacturing an optical fiber according to the embodiment, the ultraviolet curable resin 42 for an optical fiber which is recognized as an accepted product through the method of inspecting the ultraviolet curable resin for an optical fiber is used as, for example, the primary resin, the secondary resin layer, and the ink. For this reason, it is possible to prevent the occurrence of the low-temperature loss increase and the coating defects of the appearance in the manufactured optical fiber 17.

Example

Hereinafter, Example will be described.

As illustrated in FIG. 6, the degree of air bubbles which are mixed into the ultraviolet curable resin for an optical fiber is inspected through the method of inspecting the ultraviolet curable resin for an optical fiber according to the above-described embodiment. As an inspecting target, the ultraviolet curable resin 42 for an optical fiber having viscosity of 1.2 Pa·s to 6.2 Pa·s at a temperature of 25±5° C. is used. The temperature of the ultraviolet curable resin 42 for an optical fiber is stably set to be 25±5° C. before performing the inspection. The test tube 41 which has an inner diameter of 25 mm and a length of 20 cm is used. In addition, the ultraviolet curable resin 42 for an optical fiber is put into the test tube 41 such that the liquid level becomes 15±1 cm, it is confirmed that the liquid level 42a becomes constant in the test tube, and then the test tube 41 is decompressed such that the pressure in the test tube 41 becomes to be equal to or lower than the pressure which is obtained by subtracting 0.05 MPa from the atmospheric pressure. After leaving the pressure in the test tube 41 to stand for 5 minutes to 20 minutes in the compressed state, the highest liquid level 43a at which the air bubble 43 generated in the liquid rises is measured. If the width from the liquid level 42a to the liquid level 43a is set to be the liquid level rise D, and the liquid level rise D is set to be a predetermined threshold, for example, equal to or lower than 40 mm (equal to or lower than 26% if it is converted into the ratio of the volume expansion), the ultraviolet curable resin for an optical fiber is recognized as an accepted product. In addition, the optical fiber 17 is manufactured by using the ultraviolet curable resin 42 for an optical fiber which is recognized as an accepted product through the method of manufacturing of the optical fiber according to the embodiment.

In the above-described Example, since the ultraviolet curable resin which is recognized as an accepted product by determining whether or not the air bubbles are mixed is used, it is possible to prevent the occurrence of air bubbles in the optical fiber. With this configuration, it is possible to prevent the loss increase, the appearance defect, or the like in the manufactured optical fiber 17.

What is claimed is:

1. A method of inspecting a degree of air bubbles which are mixed into an ultraviolet curable resin for an optical fiber having viscosity of 1.2 Pa·s to 6.2 Pa·s at a temperature of 25±5° C., the method comprising:
    placing the ultraviolet curable resin, which is an inspecting target, for an optical fiber inside a sealed apparatus, the ultraviolet curable resin for the optical fiber having viscosity of 1.2 Pa·s to 6.2 Pa·s at the temperature of 25±5° C.;
    determining, prior to decompressing an inside of the sealed apparatus, a liquid level of the ultraviolent curable resin in a testing container;
    measuring, while the inside of the sealed apparatus is decompressed, a highest liquid level of the ultraviolent curable resin in the testing container;
    determining a liquid level rise based on the determined liquid level and the measured highest liquid level;
    determining a ratio of volume expansion of the ultraviolet curable resin based on the determined liquid level rise;
    decompressing the inside of the sealed apparatus having the ultraviolet curable resin to a predetermined pressure, the inside of the sealed apparatus is left at the predetermined pressure for a predetermined time and the ultraviolet curable resin is left standing inside of the sealed apparatus; and accepting, the inspecting target as an accepted product, when the ratio of volume expansion of the ultraviolet curable resin is equal to or less than a predetermined threshold, wherein, when the ultraviolet curable resin is recognized as the accepted product, the ultraviolet curable resin is used for manufacturing optical fiber.

2. The method of inspecting an ultraviolet curable resin for an optical fiber according to claim 1, wherein the above inspecting process is performed after the ultraviolet curable resin for an optical fiber is subjected to a defoaming process.

3. The method of inspecting an ultraviolet curable resin for an optical fiber according to claim 1, wherein the above inspecting process is performed after the ultraviolet curable resin for an optical fiber is stirred and defoamed.

4. The method of inspecting an ultraviolet curable resin for an optical fiber according to claim 1, wherein the predetermined pressure is set to be equal to or lower than a pressure which is obtained by subtracting 0.05 MPa from an atmospheric pressure, the predetermined time is set to be 5 minutes to 20 minutes, and the threshold of the ratio of the volume expansion is set to be equal to or lower than 30%.

5. The method of inspecting an ultraviolet curable resin for an optical fiber according to claim 4, wherein the above inspecting process is performed after the ultraviolet curable resin for an optical fiber is subjected to a defoaming process.

6. The method of inspecting an ultraviolet curable resin for an optical fiber according to claim 4, wherein the above inspecting process is performed after the ultraviolet curable resin for an optical fiber is stirred and defoamed.

7. A method of manufacturing an optical fiber which is performed in such a manner that a bare optical fiber is coated with an ultraviolet curable resin for an optical fiber which is recognized as an accepted product which is an ultraviolet curable resin used for manufacturing optical fiber, and then the ultraviolet curable resin for an optical fiber is cured in a method of inspecting an ultraviolet curable resin for an optical fiber having viscosity of 1.2 Pa·s to 6.2 Pa·s at a temperature of 25±5° C., the method comprising:

placing the ultraviolet curable resin, which is an inspecting target, for an optical fiber inside a sealed apparatus, the ultraviolet curable resin for the optical fiber having viscosity of 1.2 Pa·s to 6.2 Pa·s at the temperature of 25±5° C.;

determining, prior to decompressing an inside of the sealed apparatus, a liquid level of the ultraviolent curable resin in a testing container;

measuring, while the inside of the sealed apparatus is decompressed, a highest liquid level of the ultraviolent curable resin in the testing container;

determining a liquid level rise based on the determined liquid level and the measured highest liquid level;

determining a ratio of volume expansion of the ultraviolet curable resin based on the determined liquid level rise;

decompressing the inside of the sealed apparatus having the ultraviolet curable resin to a predetermined pressure, the inside of the sealed apparatus is left at the predetermined pressure for a predetermined time and the ultraviolet curable resin is left standing inside of the sealed apparatus; and accepting, the inspecting target as an accepted product, when the ratio of volume expansion of the ultraviolet curable resin is equal to or less than a predetermined threshold, wherein, when the ultraviolet curable resin is recognized as the accepted product, the ultraviolet curable resin is used for manufacturing optical fiber.

* * * * *